US008894039B2

(12) United States Patent
Conaway

(10) Patent No.: US 8,894,039 B2
(45) Date of Patent: Nov. 25, 2014

(54) SINGLE RATCHET ACTUATOR WITH DUAL AIR DRIVERS

(76) Inventor: Richard L. Conaway, Grand Haven, MI (US)

( * ) Notice: Subject to any disclaimer, the term of this patent is extended or adjusted under 35 U.S.C. 154(b) by 0 days.

(21) Appl. No.: 14/119,260

(22) PCT Filed: Aug. 10, 2012

(86) PCT No.: PCT/US2012/050282
§ 371 (c)(1),
(2), (4) Date: Nov. 21, 2013

(87) PCT Pub. No.: WO2013/023128
PCT Pub. Date: Feb. 14, 2013

(65) Prior Publication Data
US 2014/0183429 A1 Jul. 3, 2014

Related U.S. Application Data

(60) Provisional application No. 61/689,025, filed on May 29, 2012, provisional application No. 61/574,843, filed on Aug. 11, 2011.

(51) Int. Cl.
*B60S 9/02* (2006.01)
*B60S 9/14* (2006.01)
*F16H 21/00* (2006.01)
*F16H 25/12* (2006.01)
*B60S 9/04* (2006.01)

(52) U.S. Cl.
CPC .. *B60S 9/04* (2013.01); *F16H 25/12* (2013.01)
USPC ............... 254/419; 254/420; 254/421; 74/25

(58) Field of Classification Search
USPC ............................. 254/419–427, 103; 74/25
See application file for complete search history.

(56) References Cited

U.S. PATENT DOCUMENTS

| 4,116,315 | A | * | 9/1978 | Vandenberg | ............... 192/48.92 |
| 4,281,852 | A | | 8/1981 | Konkle | |
| 4,400,986 | A | * | 8/1983 | Swanson et al. | ................. 74/128 |
| 4,402,526 | A | * | 9/1983 | Huetsch | ...................... 280/766.1 |
| 5,911,437 | A | * | 6/1999 | Lawrence | ...................... 254/419 |
| 6,099,016 | A | * | 8/2000 | Peveler | ......................... 254/419 |

FOREIGN PATENT DOCUMENTS

EP    1 508 725 A1    2/2005
WO   96/33894         10/1996

* cited by examiner

*Primary Examiner* — Lee D Wilson
*Assistant Examiner* — Seahee Yoon
(74) *Attorney, Agent, or Firm* — McGarry Bair PC

(57) ABSTRACT

An air driven actuator (100) uses oppositely disposed reciprocating air drivers (122, 124) to cause a single ratchet (146) to rotate via a drive plate (150) and a pawl (170). The ratchet (146) rotates a drive tube (144) that can further extend or retract landing gear on a semi-trailer.

16 Claims, 15 Drawing Sheets

US 8,894,039 B2

SINGLE RATCHET ACTUATOR WITH DUAL AIR DRIVERS

CROSS-REFERENCE TO RELATED APPLICATION

This application is a National Phase application of International Application No. PCT/US2012/050282, filed Aug. 10,2012, which claims the benefit of U.S. Provisional Application Ser. No. 61/574,843, filed Aug. 11, 2011, and U.S. Provisional Application Ser. No. 61/689,025, filed May 29, 2012, all of which are incorporated herein by reference in their entireties.

BACKGROUND OF THE INVENTION

The invention relates to ratchet mechanisms that drive rotational movement, and more particularly to an improvement in a ratchet actuator that is driven by air drivers such as might be used in a landing gear of a semi-trailer.

One environment to which the invention may be applicable is found in FIG. 1 where a conventional landing gear 10 for a semi-trailer is shown. The landing gear 10 is used to support a semi-trailer when the semi-trailer is disconnected from a tractor. The landing gear 10 is designed to expand and contract vertically. In expansion, the landing gear 10 lifts the front of a semi-trailer so that it can be disconnected from the tractor, and thereafter supports the front of the semi-trailer when the tractor departs. In contraction, the landing gear 10 lowers the front of the semi-trailer to enable connection to a tractor, and, once connected, to further gain ground clearance so the semi-trailer can be pulled by the tractor free of interference.

The landing gear 10 comprises a pair of spaced arms 12, each having a mounting bracket 14 for securing the landing gear to a frame of a semi-trailer (not shown). Each arm 12 comprises a hollow tube 16 within which is a leg that is geared to extend from and retract into the hollow tube 16. Each leg has a foot pad 18 that supports the landing gear 10 on the ground. A gearbox 20 mounted to one of the arms controls the extension and retraction of both legs by way of a cross drive shaft 22 extending between the arms 12. The gearbox 20 is manually driven by a crank handle 24. It can require substantial torque via the gearbox 20 to raise a loaded semi-trailer, on the order of approximately 100 foot pounds.

It is known to use pneumatic assist for a landing gear on a semi-trailer. U.S. Pat. Nos. 4,402,526 and 4,400,986 disclose a pneumatically operated actuator with a complex system of gears and ratchets. U.S. Pat. No. 4,116,315 discloses a pneumatically operated actuator with a complex clutch mechanism. There reminds a need for a simpler, lower cost actuator that can be applied to existing systems retroactively without undue modification.

BRIEF SUMMARY OF THE INVENTION

In one embodiment, an air comprises a main housing, with a drive tube rotatably mounted to the housing. The drive tube has a single ratchet fixed thereto, and the single ratchet has a plurality of teeth. One or more drive plates are rotatably mounted to the drive tube and a pawl is rotatably mounted to the drive plate in a position to engage the teeth on the single ratchet. First and second air drivers are mounted to opposite sides of the main housing, each having a reciprocating stroke shaft pivotably connected to the drive plate in a position to cause the drive plate to rotate as the stroke shafts reciprocate. When the pawl is engaged with one of the teeth, activation of one of the air drivers will cause drive plate and the single ratchet in a power stroke to urge the drive tube to rotate in a first direction, and activation of the other air driver will cause the drive plate to rotate in an opposite direction on the drive tube in a return stroke to move the pawl to engage another of the teeth on the single ratchet.

DESCRIPTION OF EMBODIMENTS OF THE INVENTION

Figure 1:
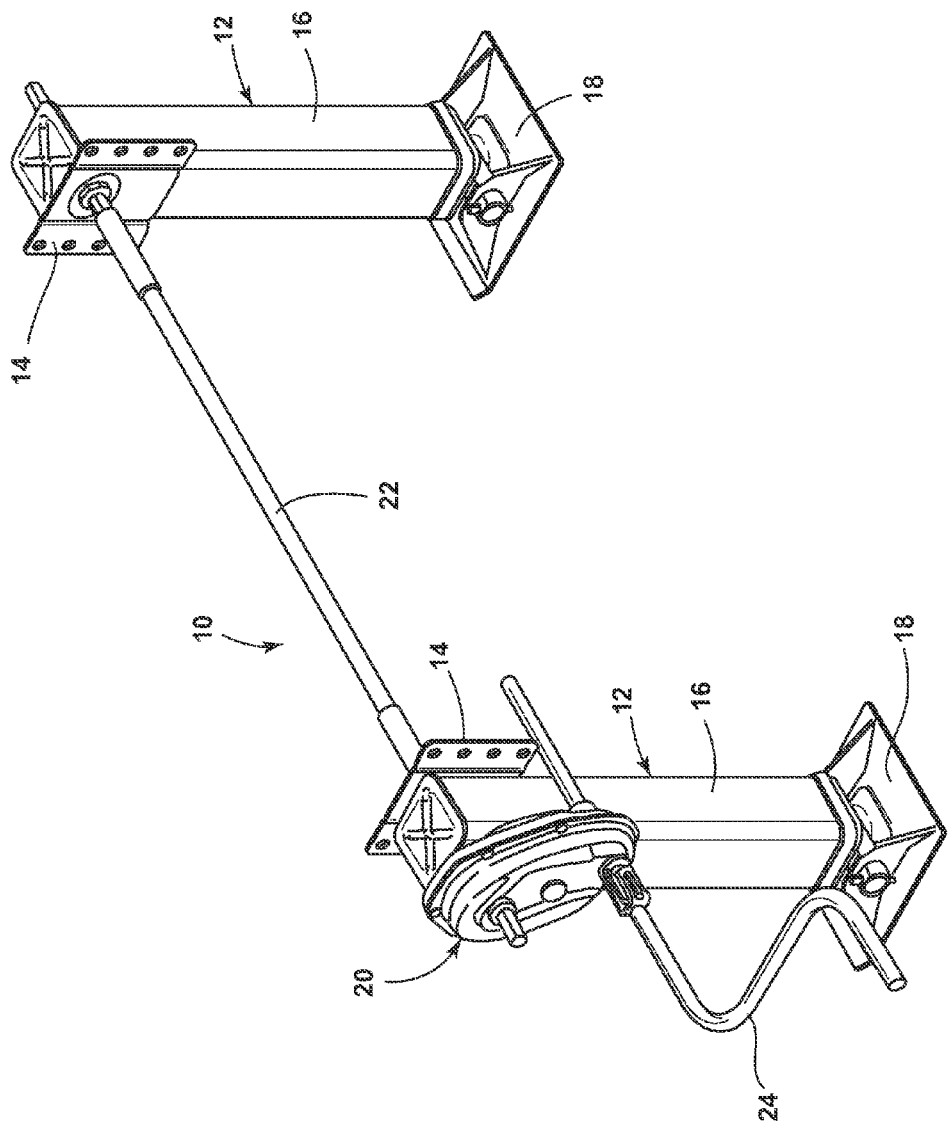
FIG. 1 is a perspective view of a conventional semi-trailer landing gear in the prior art.
Figure 2:
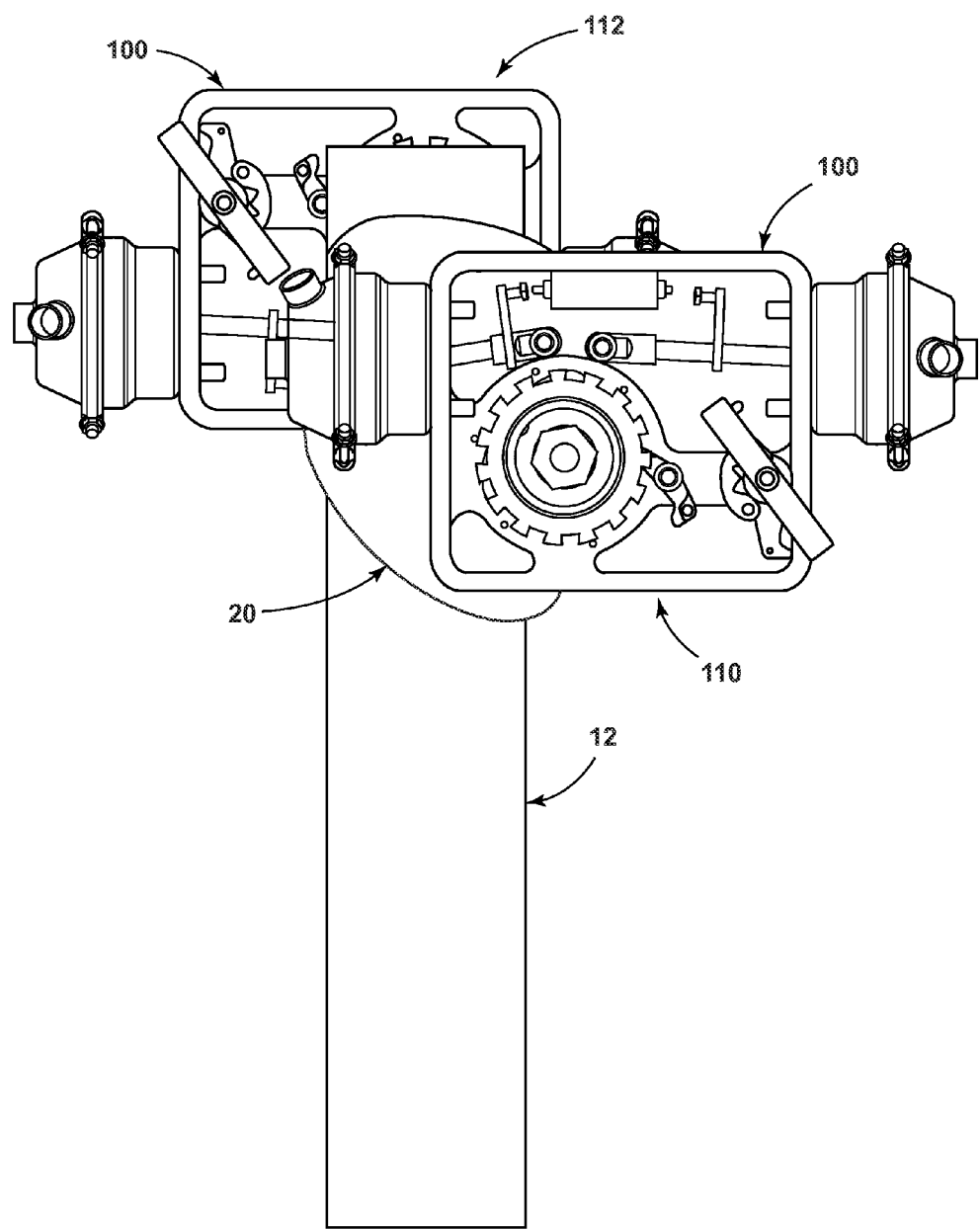
FIG. 2 is a side view showing two possible locations of an embodiment of an actuator in accord with the invention for a conventional landing gear such as that of FIG. 1.

FIG. 2 shows an embodiment of an actuator 100 according to the invention as it may be applied to a conventional landing gear 10 of FIG. 1. In a first position 110, the actuator 100 can be mounted to the gearbox 20 to operate a shaft, thereby either replacing the crank handle 24 of the prior art, or supplementing it. In either configuration, the actuator can assume all power to drive the gearbox 20. Alternatively, as will be explained later, the actuator can be disengaged to a neutral state so that the crank handle 24 can manually operate the gearbox 20 if needed. For example, if there were a failure of the air system that drives the actuator, the crank handle 24 can still be used to actuate the landing gear 10.

In a second position 112, the actuator 100 can be mounted to a landing gear mounting bracket 14 to directly drive the cross drive shaft 22. It will be appreciated that the actuator 100 can supply sufficient torque to directly drive the cross drive shaft 22 and thereby eliminate any need for the gearbox 20. Benefits of the actuator 100 include lower costs for semi-trailer landing gears, remote operation from a truck cab, and both OEM and aftermarket installation options.

Figure 3:
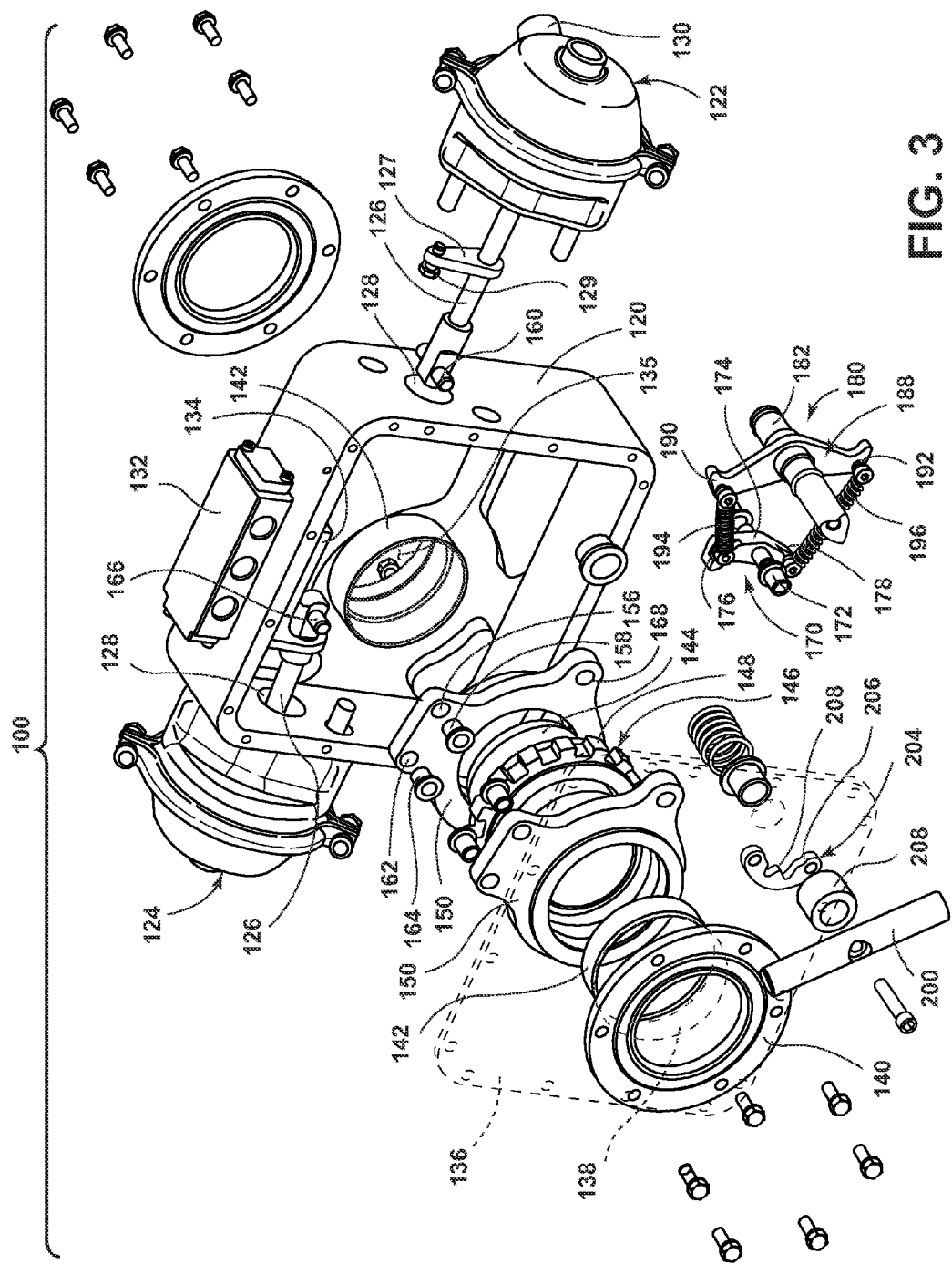
FIG. 3 is an exploded view of an embodiment of an actuator according to the invention.
Figure 15:
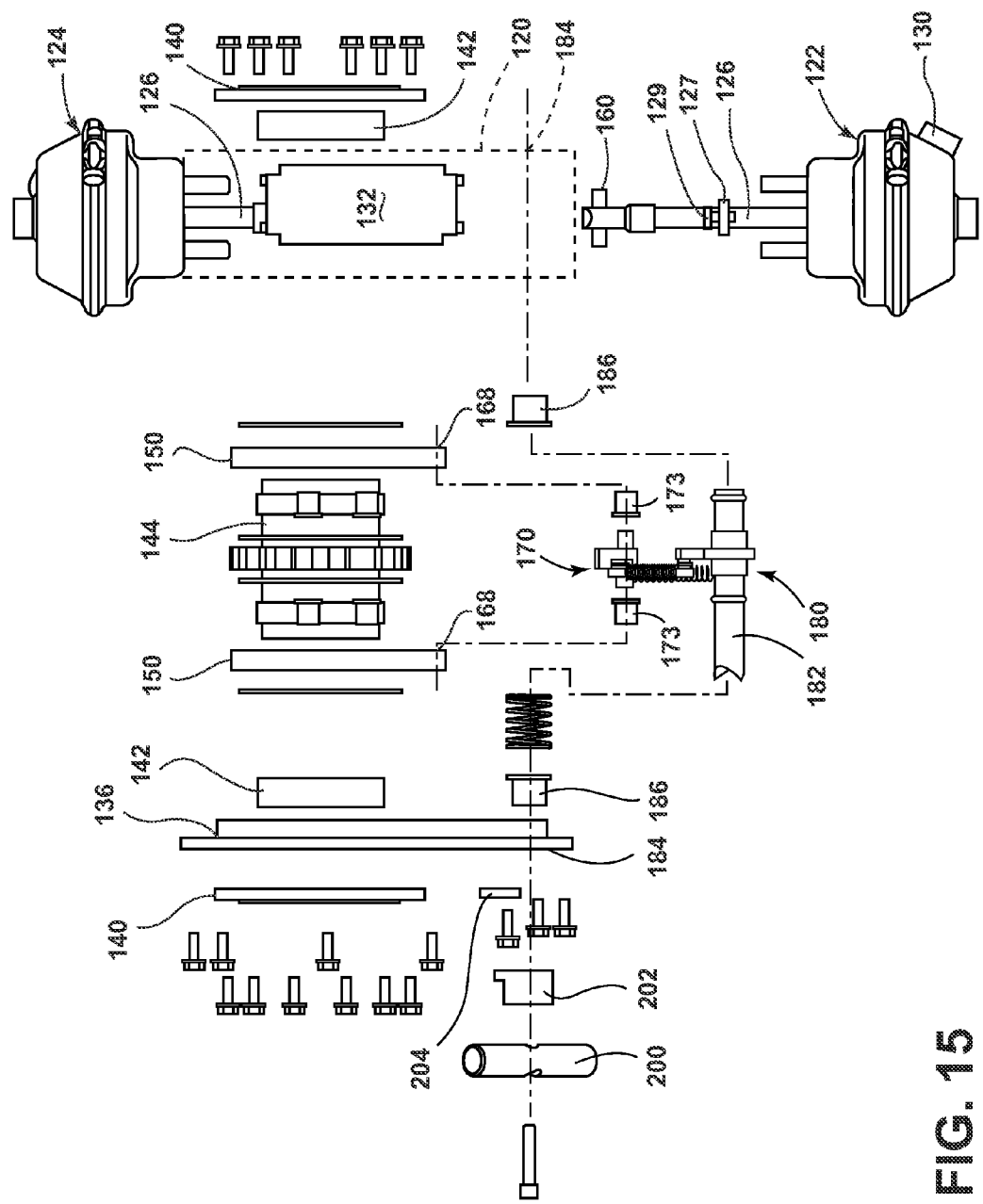
FIG. 15 is an exploded top of the actuator of FIG. 3.

Referring now to FIGS. 3 and 15, the actuator 100 according to the invention is shown with its constituent elements. The actuator 100 comprises a main housing 120. Mounted to the housing on a first side is a first air driver 122 and on an opposing side a second air driver 124. Each air driver 122, 124 is similar in structure and can be a conventional brake actuator as shown, having a housing that defines an interior air chamber with a diaphragm suspended therein, a stroke shaft 126 extending from the diaphragm outwardly from the air driver housing and through an aperture 128 in the main housing 120. Each air driver 122, 124 has an air inlet 130 which may be located anywhere on the housing in a position to direct pressurized air toward the diaphragm. A main air control valve 132 on the main housing 120 is plumbed to direct pressurized air toward the air inlets 130, and is controlled by a pilot valve 134 on the inside of the main housing 120. Each stroke shaft 126 has a control plate 127 extending radially therefrom with a valve stop 129 on the end of the plate, positioned to actuate the pilot valve 134 when the respective stroke shaft reaches a predetermined point in the stroke. Thus, for example, when the valve stop 129 on the control plate 127 on the stroke shaft 126 extending from the first air driver 122 contacts the pilot valve 134, the pilot valve causes the main air control valve 132 to stop the flow of pressurized air going to the first air driver 122 so that further extension of the stroke shaft 126 from the first air driver 122 ceases. Preferably, the position of the control plates 127 on the stroke shafts 126 is adjustable.

The main housing 120 has a first drive aperture 134 and a front cover 136 with a second drive aperture 138 positioned to be aligned with the first drive aperture when the front cover is secured to the main housing. Lip seals and mounting rings 140 constrain main drive support bearings 142 in the first and second drive apertures 134, 138. A drive tube 144 is rotatably mounted in the main drive support bearings 142 for rotation relative to the housing 120. A single ratchet 146 haying a plurality of teeth 148 is secured to the drive tube 144 adjacent to at least one drive plate 150 and preferably intermediate two drive plates 150 that are rotatably mounted to the drive tube on drive plate bearings 152. Thrust bearings 154 are placed as needed on the drive tube 144.

The drive plates 150 have first aligned drive apertures 156 with drive plate bearings 158 to which a stroke shaft 126 from the first air driver 122 is pivotally mounted by way of a cross shaft 160. Similarly the drive plates 150 have second aligned drive apertures 162 with drive plate bearings 164 to which a stroke shaft 126 from the second air driver 124 is pivotally mounted by way of a cross shaft 166. Third aligned pawl shaft apertures 168 in the drive plates 150 are adapted to mount a pawl 170. The pawl 170 has a shaft 172 that rotatably mounts to the third aligned pawl shaft apertures 168 via pawl shaft bearings 174, and comprises a lever arm 174 with a first dog end 176 and a second dog end 178. Rotation of the pawl about the axis of the shaft 172 causes the first dog end 176 or the second dog end 178 to engage a tooth 148 on the ratchet 146.

A directional control 180 controls which direction the ratchet 146 and its drive tube 144 rotate. The directional control 180 comprises a control shaft 182 that is rotatably mounted in aligned control shaft apertures 184 in the main housing 120 and the front cover 136 via control shaft bearings 186. A control lever arm 188 extends radially in opposite directions from the control shaft 182, terminating in a first end 190 and a second end 192. A first directional control spring 194 is secured between the first dog end 176 of the pawl 170 and the first end 190 of the control lever arm 174, and a second directional control spring 196 is secured between the second dog end 178 of the pawl 170 and the second end 192 of the control lever arm 174. A direction control handle 200 is fixed to the end of the control shaft 182 to enable manually rotating the control shaft 182. A pointer 202 is mounted to the control shaft 182 adjacent to the direction control handle 200 and adjacent to a directional lock plate 204 on the front cover 136. The directional lock plate 204 has two detents 206, 208 positioned to selectively receive the pointer 202. A compression spring 206 biases the control shaft 182 so that the pointer 202 remains aligned with the directional lock plate 204 with the pointer nested in one of the detents 206, 208. As the direction control handle 200 is rotated, the pointer 202 is moved between one of the other of the detents to hold the control shaft 182 in a fixed position corresponding to the selected detent 206, 208. It will be apparent that as the control shaft 182 rotates, the control lever arm 174 also rotates, moving one or the other of the first and second ends 190, 192 away from the respective first and second dog ends 176, 178 of the pawl 170, and also placing the respective first or second directional control spring 194, 196 into greater tension than the other directional control spring. Of course, the greater tension in the first or second directional control spring 194, 196 also tends to urge the respective first or second dog end 176, 178 away from engagement with the ratchet tooth 148.

Figure 4:
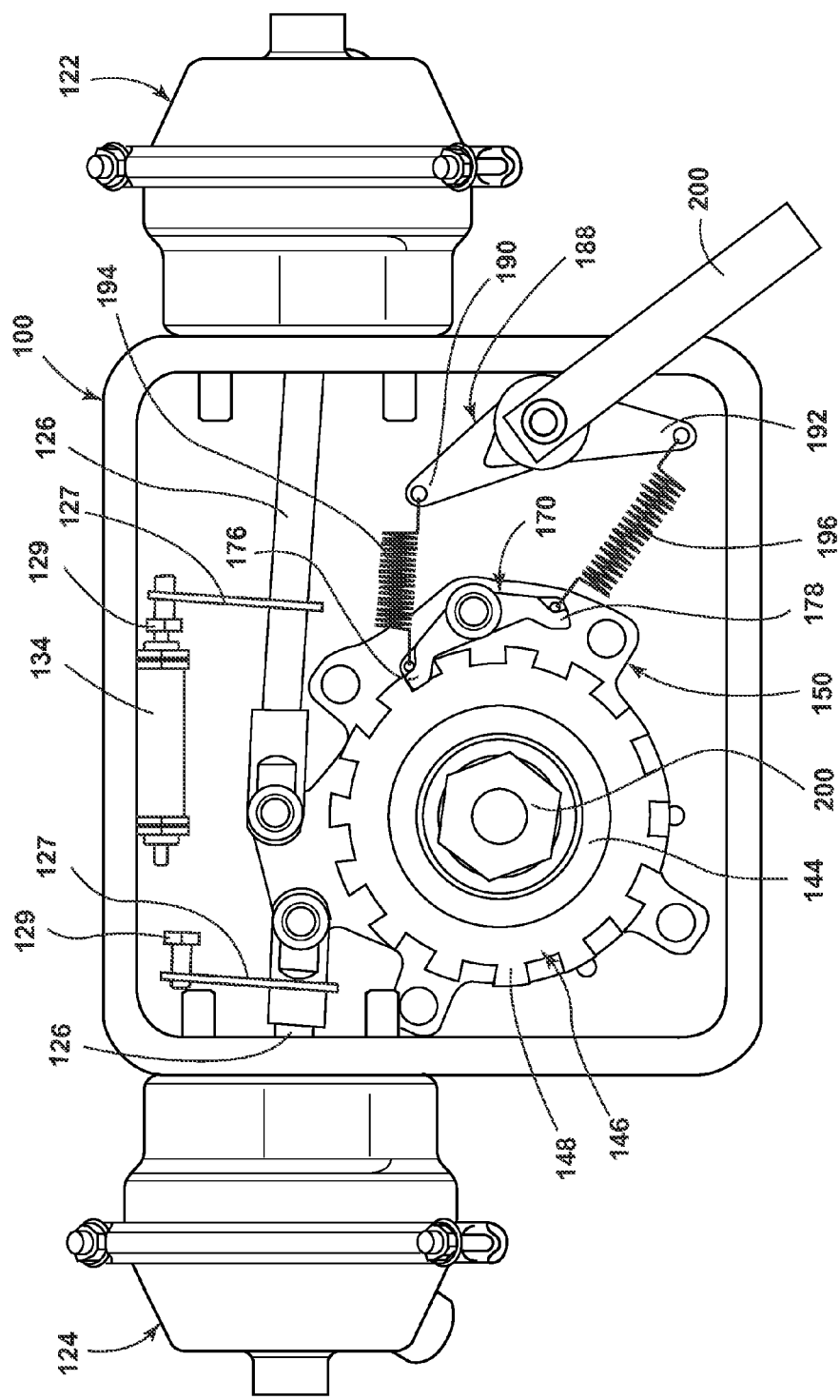
FIG. 4 is a fragmentary side view of the embodiment of the actuator of FIG. 3 at the end of a first power stroke in a first direction.

Operation of the actuator 100 is shown in FIGS. 4-13. Starting with FIG. 4, the actuator 100 is shown with the front cover 136 and one of the drive plates 150 removed and with the directional control 180 set for a first direction, meaning that the ratchet 146 is enabled to rotate only counterclockwise in this view. In this configuration the first air driver 122 provides a power stroke to move the ratchet and the second air driver 124 provides a return stroke to reset the pawl for another power stroke. FIG. 4 shows the mechanism as it would appear the end of a first power stroke in the first direction. The stroke shaft 126 on the second air driver 124 is retracted and the stroke shaft 126 extending from the first air driver 122 has reached its maximum extension. The valve stop 129 on the control plate 127 on the stroke shaft 126 extending from the first air driver 122 has contacted the pilot valve 134, which has caused the main air control valve 132 to stop the flow of pressurized air going to the first air driver 122 so that further extension of the stroke shaft 126 from the first air driver 122 ceases. The direction control handle 200 is rotated so that the second end 192 of the control lever arm 174 has moved away from the drive plates 15, placing tension in the second directional spring 196, which in turn has urged the second dog end 178 away from the ratchet 146. Consequent rotation of the pawl 170 about the axis of the pawl shaft 172 has forced the first dog end 176 of the pawl 170 into engagement with a tooth 148 on the ratchet 146. Meanwhile, the drive plates 150, to which the stroke shafts 126 are pivotably mounted, has been rotated to its maximum counterclockwise position relative to the main housing 120.

Figure 5:
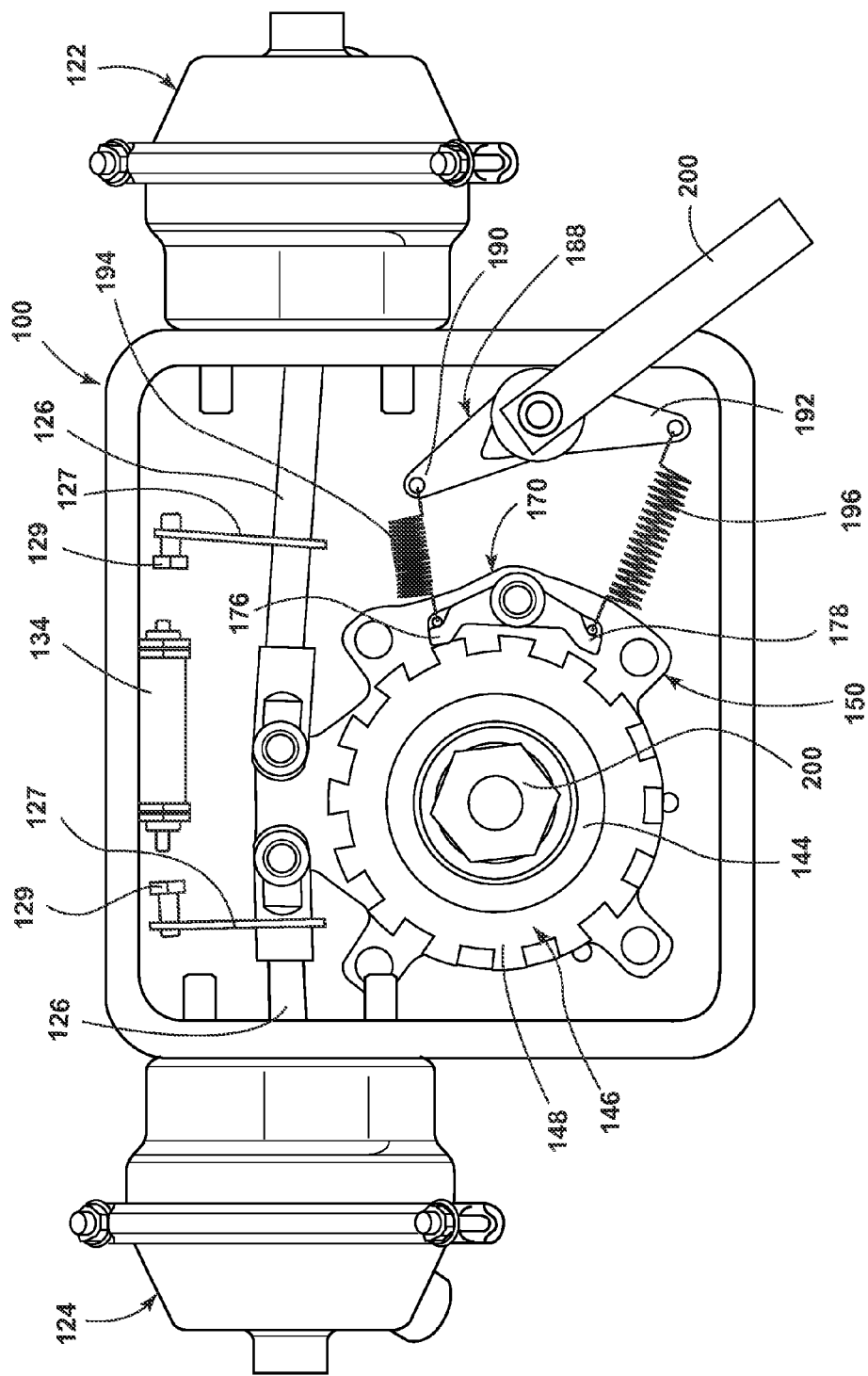
FIG. 5 is a fragmentary side view of the embodiment of actuator of FIG. 3 at the beginning of a first return stroke in the first direction.

FIG. 5 shows the actuator 100 beginning a first return stroke immediately following the first power stroke. Here, actuation of the pilot valve 134 has not only caused the main air control valve 132 to stop the flow of pressurized air going to the first air driver 122, but it has also caused the main air control valve 132 to direct pressurized air into the second air driver 124, causing the stroke shaft 126 to further extend from the second air driver 124. Simultaneously, the stroke shaft 126 on the first air driver 122 retracts because the pressurized air therein has been exhausted. Extension of the stroke shaft 126 in turn causes the drive plates 150 to rotate clockwise in this view on the drive tube 144 and relative to the ratchet 146. Rotation of the drive plates 150 causes the first dog end 176 of the pawl 170 out of engagement with the respective tooth 148 on the ratchet 146, also causing the pawl shaft 172 to rotate on its axis, drawing the second dog end 178 toward the ratchet and increasing tension in the second directional spring 196.

Figure 6:
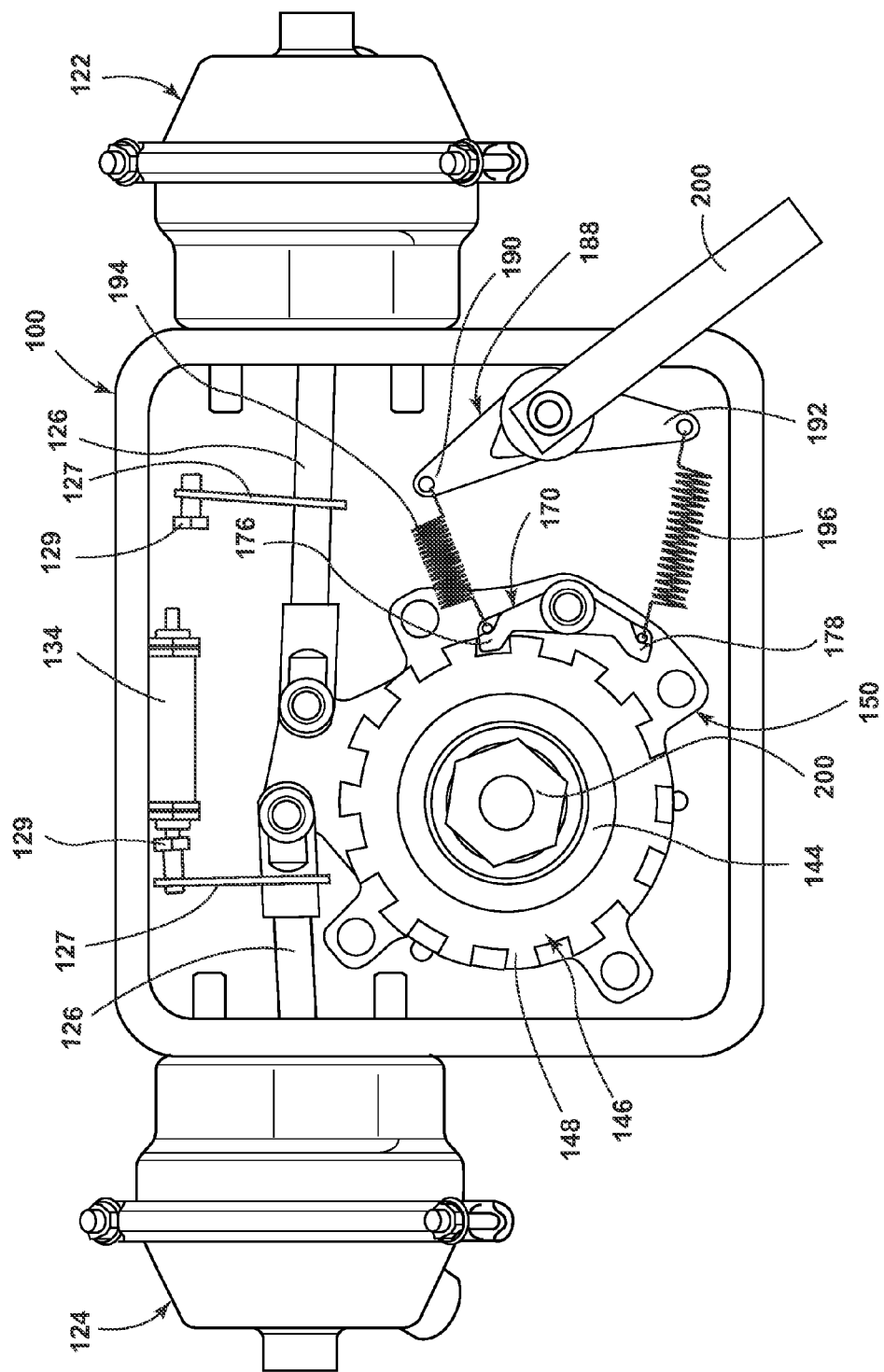
FIG. 6 is a fragmentary side view of the embodiment of the actuator of FIG. 3 at the end of the first return stroke in the first direction.

In FIG. 6, the stoke shaft 126 on the second air driver 124 has achieved its maximum extension when the valve stop 129 on the control plate 127 on the stroke shaft 126 extending from the second air driver 124 has contacted the pilot valve 134, which has caused the main air control valve 132 to stop the flow of pressurized air going to the second air driver 124 so that further extension of the stroke shaft 126 from the second air driver 124 ceases. Also, the drive plates 150 have rotated far enough so the increased tension in the second directional spring 196 has urged the pawl 170 rotate so that the first dog end 176 has engaged the next tooth 148 on the ratchet 146.

Figure 7:
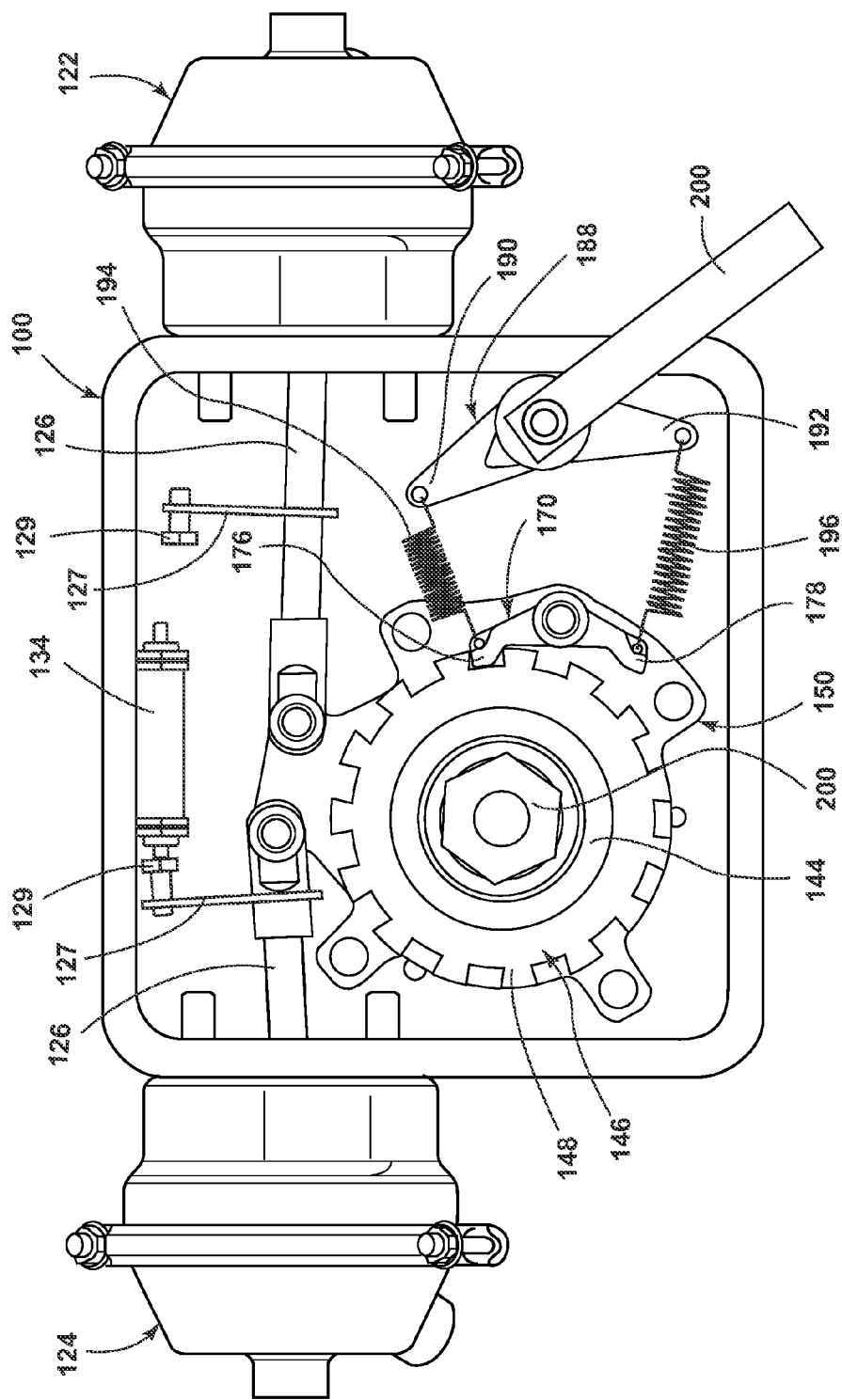
FIG. 7 is a fragmentary side view of the embodiment of the actuator of FIG. 3 at the beginning of a second power stroke in the first direction.

FIG. 7 shows the beginning of a second power stroke in the first direction. Here, actuation of the pilot valve 134 has not only caused the main air control valve 132 to stop the flow of pressurized air going to the second air driver 124, but it has also caused the main air control valve 132 to direct pressurized air into the first air driver 122, causing the stroke shaft 126 to further extend from the first air driver 122. Simultaneously, the stroke shaft 126 on the second air driver 124 retracts because the pressurized air therein has been exhausted. Extension of the stroke shaft 126 in turn causes the drive plates 150 to rotate counterclockwise in this view on the drive tube 144. Now, however, because the first dog end 176 has engaged the next tooth 148 on the ratchet 146, it drives the ratchet and the drive tube 144 in a counterclockwise direction in this view.

Figure 8:
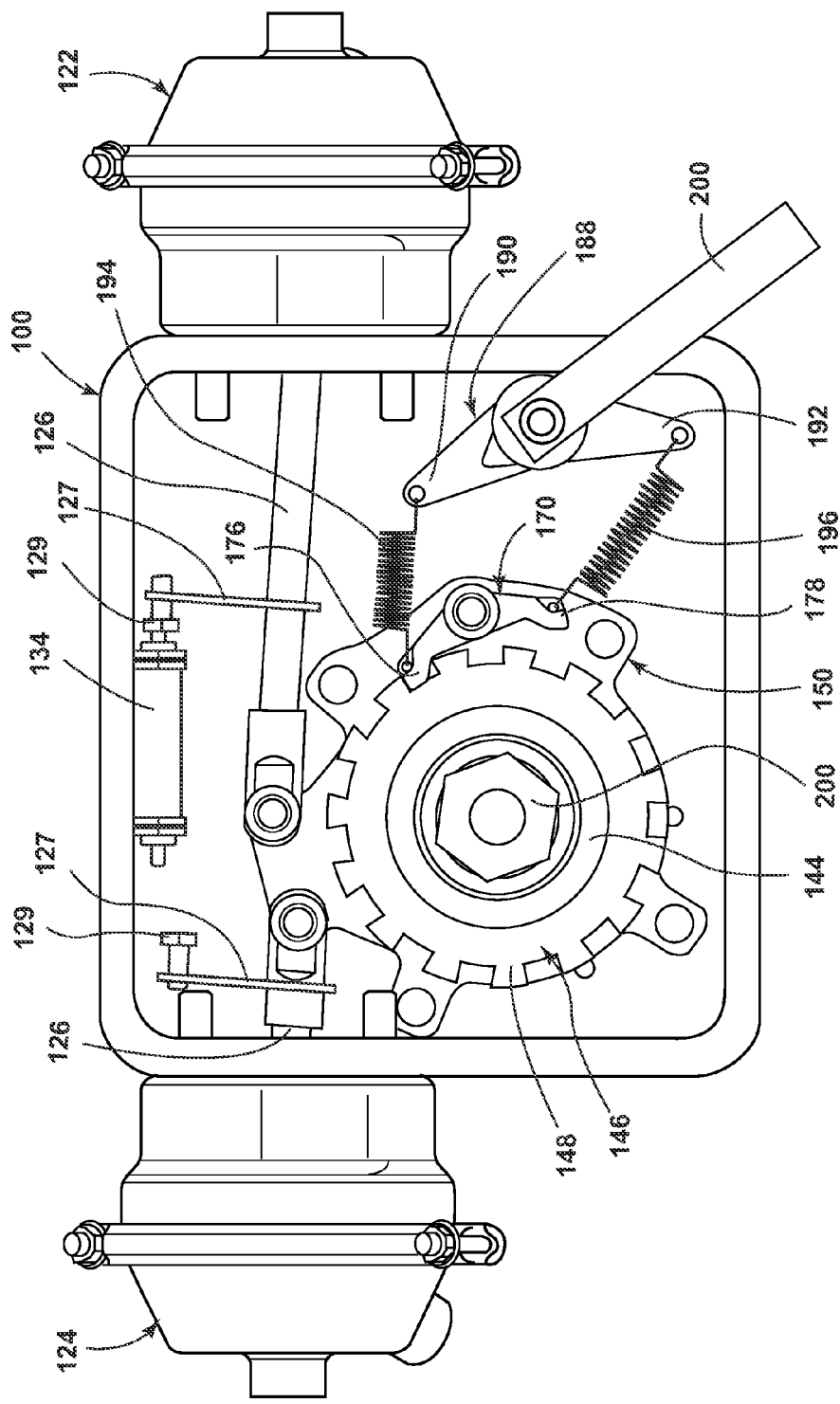
FIG. 8 is a fragmentary side view of the embodiment of the actuator of FIG. 3 at the end of the second power stroke in the first direction.

Rotation in FIG. 7 continues until the valve stop 129 on the control plate 127 on the stroke shaft 126 extending from the first air driver 122 has contacted the pilot valve 134, which has caused the main air control valve 132 to stop the flow of pressurized air going to the first air driver 122 so that further extension of the stroke shaft 126 from the first air driver 122 ceases at the end of the second power stroke as in FIG. 8. It can be seen that the configuration of the actuator 100 in FIG. 8 at the end of the second power stroke is identical to the configuration of the actuator 100 in FIG. 4 at the end of the first power stroke, except that the ratchet and the drive tube have been rotated counterclockwise in the first direction. It will be apparent that the reciprocating action of the air drivers 122, 124 will continue to rotate the ratchet 146 until the motion is stopped. Halting the motion can be effected by any of several different ways, including, for example, cutting off the flow of air by a stop valve.

Figure 9:
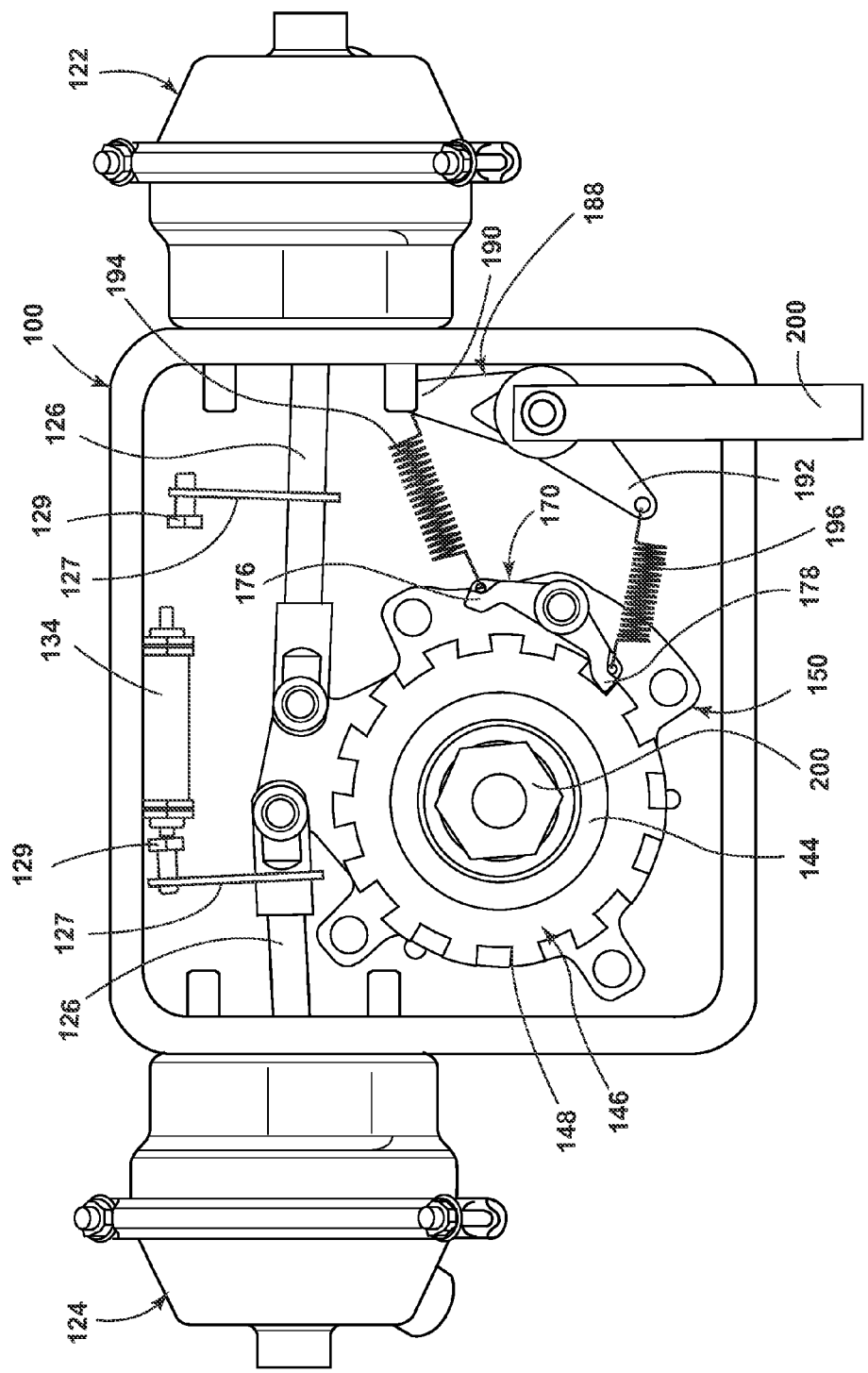
FIG. 9 is a fragmentary side view of the embodiment of the actuator of FIG. 3 at the end of a first power stroke in a second direction.

FIG. 9 shows the actuator 100 as it would appear the end of a first power stroke in a second direction. The directional control 180 is set for the second direction, meaning that the ratchet 146 is enabled to rotate only clockwise in this view. In this configuration the second air driver 124 provides a power stroke to move the ratchet and the first air driver 122 provides a return stroke to reset the pawl 170 for another power stroke. The stroke shaft 126 on the first air driver 122 is retracted and the stroke shaft 126 extending from the second air driver 124 has reached its maximum extension. The valve stop 129 on the control plate 127 on the stroke shaft 126 extending from the second air driver 124 has contacted the pilot valve 134, which has caused the main air control valve 132 to stop the flow of pressurized air going to the second air driver 124 so that further extension of the stroke shaft 126 from the second air driver 124 ceases. The direction control handle 200 is rotated so that the first end 190 of the control lever arm 174 has moved away from the drive plates 150, placing tension in the first directional spring 194, which in turn has urged the first dog end 176 away from the ratchet 146. Consequent rotation of the pawl 170 about the axis of the pawl shaft 172 has forced the second dog end 178 of the pawl 170 into engagement with a tooth 148 on the ratchet 146. Meanwhile, the drive plates 150, to which the stroke shafts 126 are pivotably mounted, have been rotated to a maximum clockwise position relative to the main housing 120.

Figure 10:
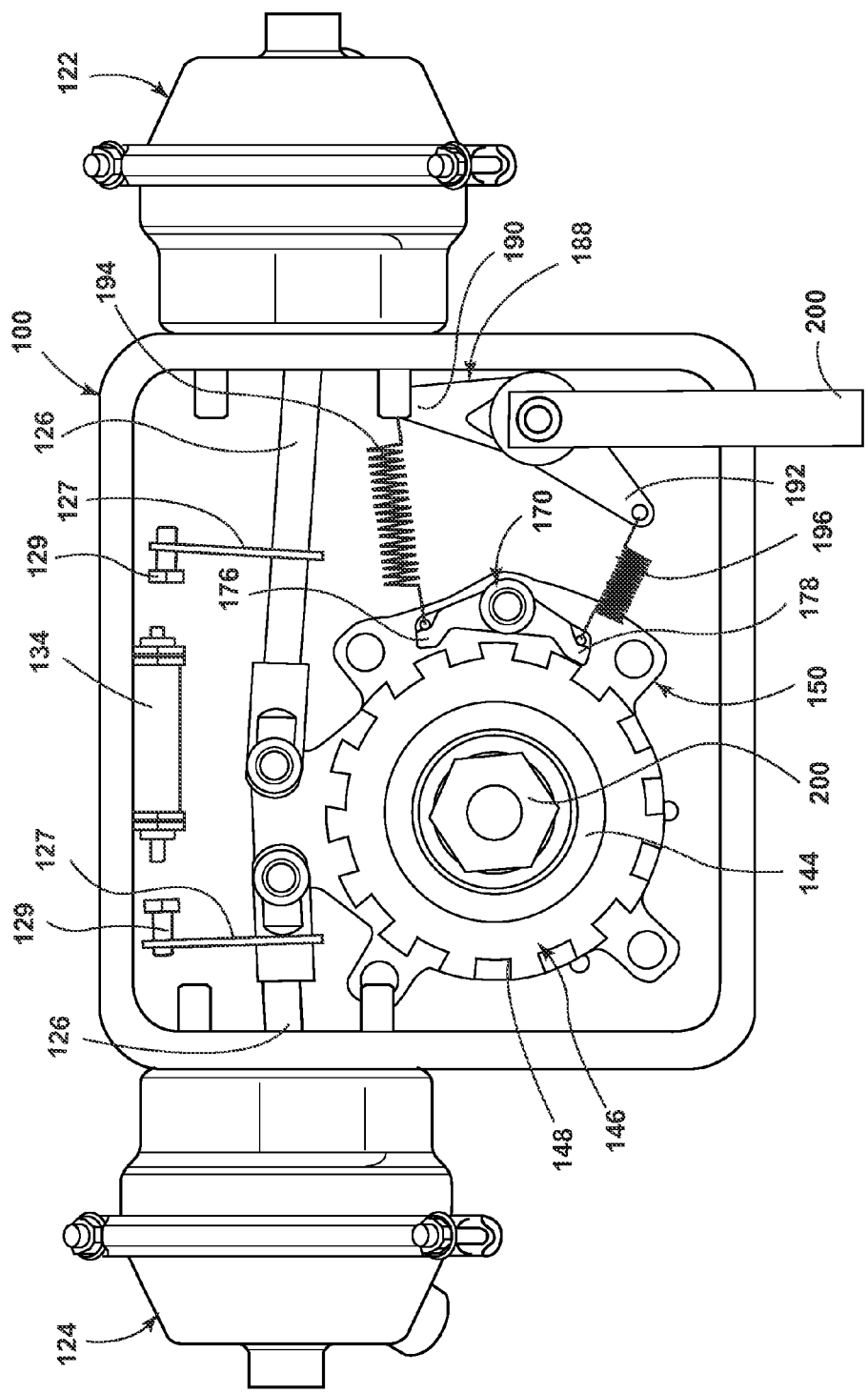
FIG. 10 is a fragmentary side view of the embodiment of the actuator of FIG. 3 at the beginning of a first rerun stroke in the second direction.

FIG. 10 shows the actuator 100 beginning a first return stroke immediately following the first power stroke in the second direction. Here, actuation of the pilot valve 134 has not only caused the main air control valve 132 to stop the flow of pressurized air going to the second air driver 124, but it has also caused the main air control valve 132 to direct pressurized air into the first air driver 122, causing the stroke shaft 126 to further extend from the first air driver 122. Simultaneously, the stroke shaft 126 on the second air driver 124 retracts because the pressurized air therein has been exhausted. Extension of the stroke shaft 126 in turn causes the drive plates 150 to rotate counterclockwise in this view on the drive tube 144 and relative to the ratchet 146. Rotation of the drive plates 150 causes the second dog end 176 of the pawl 170 out of engagement with the respective tooth 148 on the ratchet 146, also causing the pawl shaft 172 to rotate on its axis, drawing the first dog end 176 toward the ratchet and increasing tension in the first directional spring 194.

Figure 11:
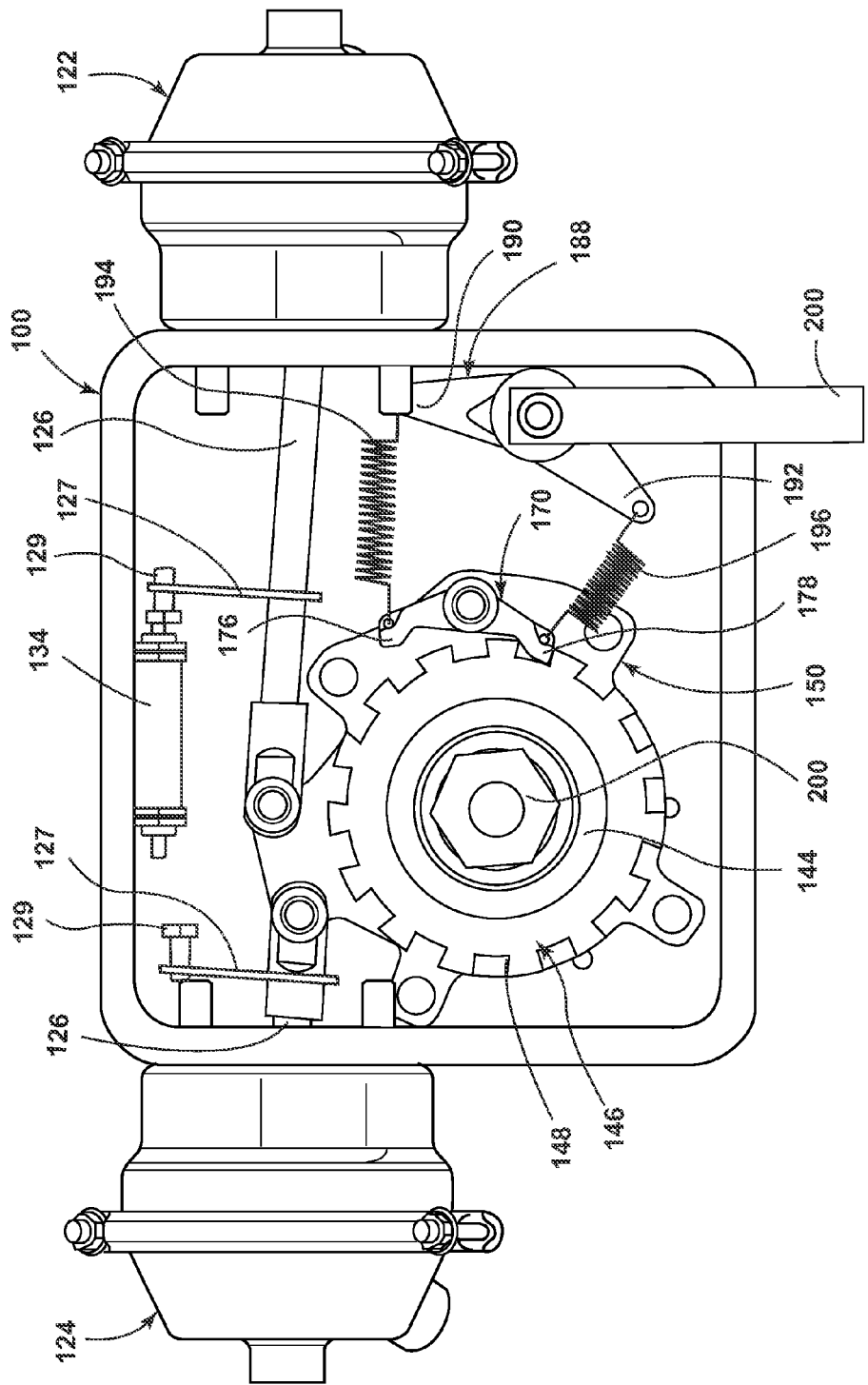
FIG. 11 is a fragmentary side view of the embodiment of the actuator of FIG. 3 at the end of the first return stroke in the second direction.

In FIG. 11, the stoke shaft 126 on the first air driver 122 has achieved its maximum extension when the valve stop 129 on the control plate 127 on the stroke shaft 126 extending from the first air driver 122 has contacted the pilot valve 134, which has caused the main air control valve 132 to stop the flow of pressurized air going to the first air driver 122, so that further extension of the stroke shaft 126 from the first air driver 122 ceases. Also, the drive plates 150 have rotated far enough so the increased tension in the first directional spring 194 has urged the pawl 170 to rotate so that the second dog end 178 has engaged the next tooth 148 on the ratchet 146.

Figure 12:
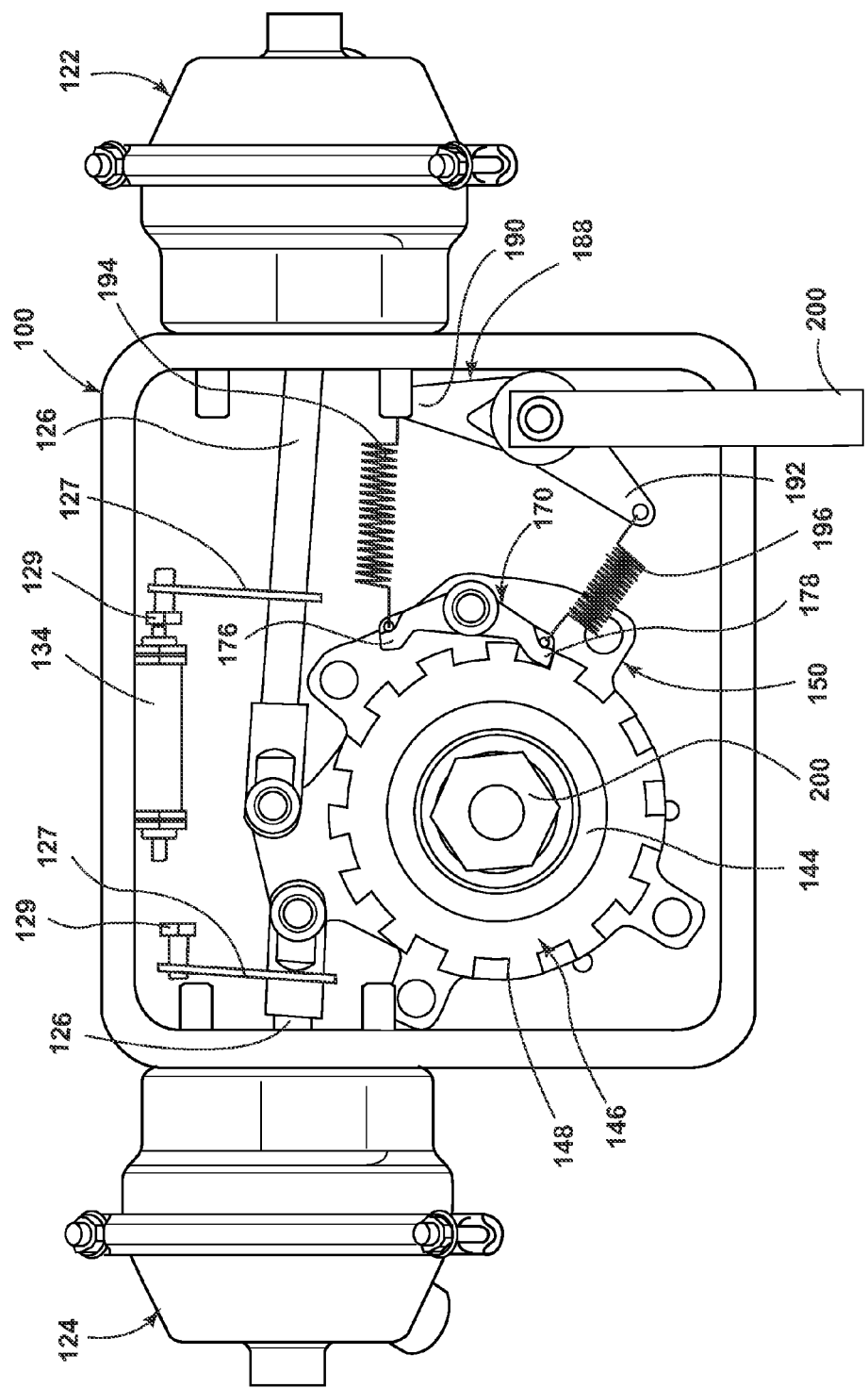
FIG. 12 is a fragmentary side view of the embodiment of the actuator of FIG. 3 at the beginning of a second power stroke in the second direction.

FIG. 12 shows the beginning of a second power stroke in the second direction. Here, actuation of the pilot valve 134 has not only caused the main air control valve 132 to stop the flow of pressurized air going to the first air driver 122, but it has also caused the main air control valve 132 to direct pressurized air into the second air driver 124, causing the stroke shaft 126 to further extend from the second air driver 124. Simultaneously, the stroke shaft 126 on the first air driver 122 retracts because the pressurized air therein has been exhausted. Extension of the stroke shaft 126 in turn causes the drive plates 150 to rotate clockwise in this view on the drive tube 144. Now, however, because the second dog end 178 has engaged the next tooth 148 on the ratchet 146, it drives the ratchet and the drive tube 144 in a clockwise direction in this view.

Figure 13:
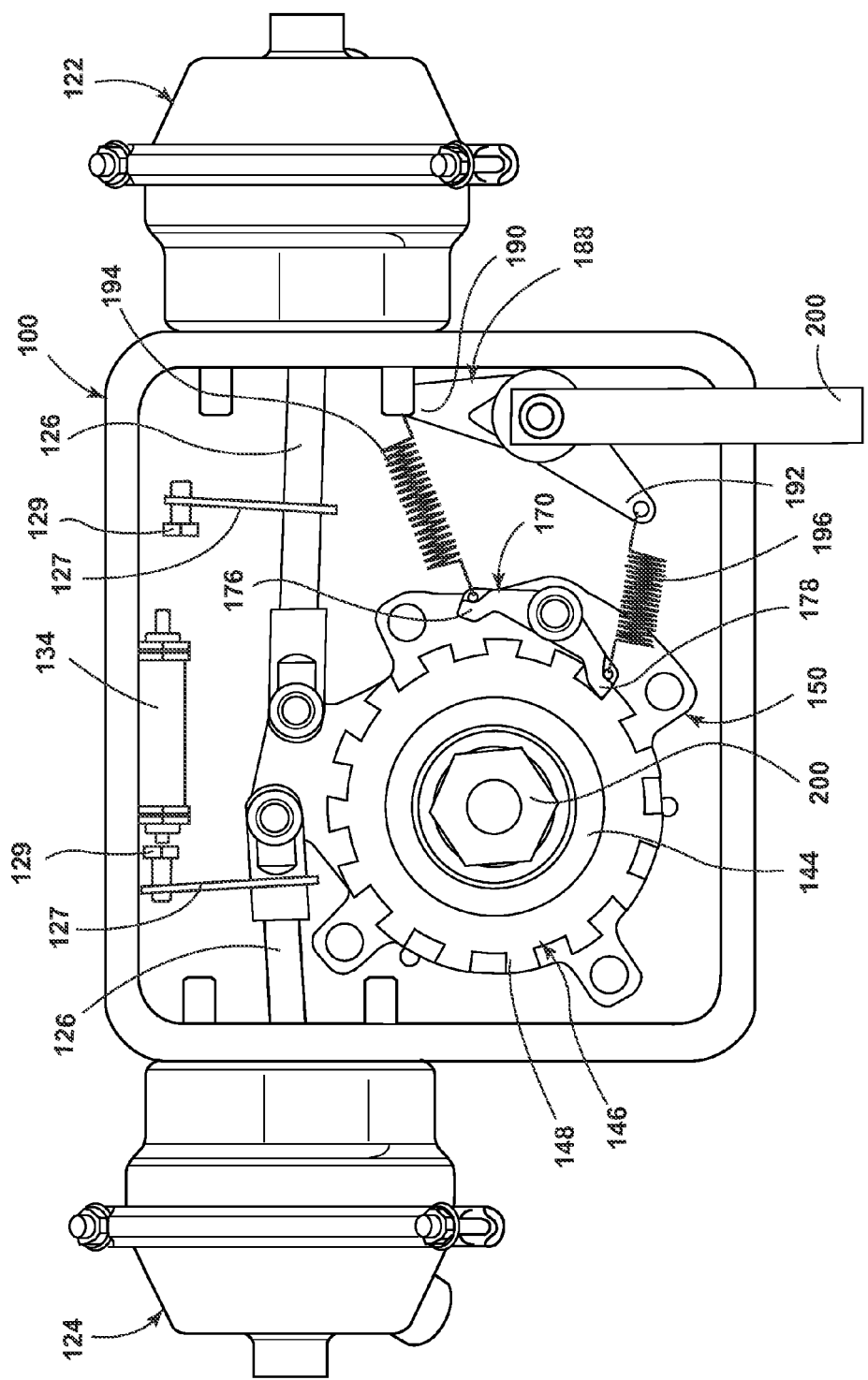
FIG. 13 is a fragmentary side view of the embodiment of the actuator of FIG. 3 at the end of the second power stroke in the second direction.

Rotation in FIG. 12 continues until the valve stop 129 on the control plate 127 on the stroke shaft 126 extending from the second air driver 124 has contacted the pilot valve 134, which has caused the main air control valve 132 to stop the flow of pressurized air going to the second air driver 124 so that further extension of the stroke shaft 126 from the second air driver 122 ceases at the end of the second power stroke as in FIG. 13. It can be seen that the configuration of the actuator 100 in FIG. 13 at the end of the second power stroke is identical to the configuration of the actuator 100 in FIG. 9 at the end of the first power stroke, except that the ratchet and the drive tube have been rotated clockwise in the second direction. As with the first direction, it will be apparent that the reciprocating action of the air drivers 122, 124 will continue to rotate the ratchet 146 until the motion is stopped. Halting the motion can be effected by any of several different ways, including, for example, cutting off the flow of air by a stop valve.

It will be apparent that the drive tube 144 which is caused to rotate in the actuator 100 can be keyed to also rotate a shaft. For example, a hex key 200 in the drive tube 144 can be adapted to rotate a complementary shaped shaft such as a shaft to drive the gearbox 20 or the cross shaft 22 as in RIG. 2.

Figure 14:
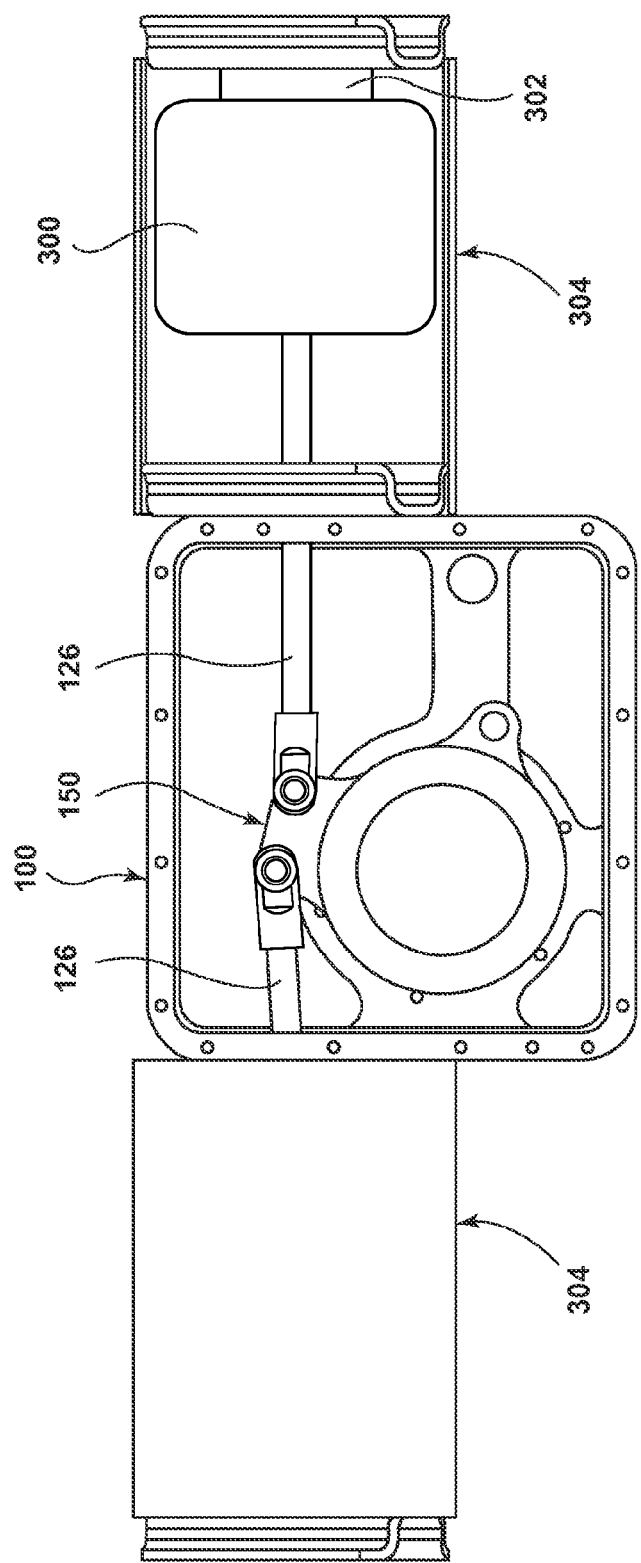
FIG. 14 is a fragmentary side view of another embodiment of an actuator according to the invention.

Other embodiments and modifications evident to those skilled in art are within the scope of the invention. For example, FIG. 14 shows that instead of conventional brake actuators, the air drivers can be rolling lobe air springs 300 with solid pistons 302, each enclosed in a can 304. Any kind of pneumatic actuator can be used effectively for an air driver, such as pneumatic air cylinders and the like. Further, operation of the pilot valve 134 need not be effected by the control plates 127 on the stroke shafts 126. Pilot valve actuators can be located on the drive plates 150 with the pilot valve 134 positioned elsewhere than the top of the main housing 120 in order to be acted upon the pilot valve actuators. It is important only that the rotation of the drive plates 150 be coordinated with the actuation of the pilot valve 134. Activating the actuator can be accomplished remotely. For example, an air valve can be activated from a tractor connected to a semi-trailer, which air valve can initiate and/or stop flow of pressurized air to the main air control valve 132. As well, a remotely activated solenoid or motor can drive the direction control handle 200 or the control shaft 182 to remotely change direction of rotation of the drive tube 144. Yet further, a third lock position of the control shaft 182 can place the directional control 180 into neutral where the pawl is fully disengaged from the ratchet. Alternatively, the pilot valve 1034 and/or the main air control valve 132 can be disengaged such that the ratchet can be manually rotated by a crank handle, bypassing the actuator 100. Key shapes other than hex can be used effectively to cause a shaft to be driven by the drive tube 144. As well, a shaft can be splined into the drive tube 144.

Advantages of an air drive actuator according to the invention include an actuator having less weight with fewer parts, a design that is much simpler to manufacture, and very few parts that have to be machined and/or produced for a single product so that any tooling necessary to start a production process minimal. The simpler design according to the invention renders it less costly to produce. Parts requiring high stress tolerances are minimized in the inventive design. The use of reciprocating air drivers such as brake chambers, which are mass produced, renders the most cost effective landing gear actuator known to date. Another benefit of dual air drivers is energy savings. Not using an opposing spring to reset the air driver and instead using an opposing air driver as the reset means that in either direction the inventive design requires less air pressure to achieve a desired ratcheting motion of the device. Less air pressure means quicker activation of the device and also less energy to replenish air in a supplying reservoir.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. An air driven actuator comprising:
a main housing;
a drive tube rotatably mounted to the housing and having a single ratchet fixed thereto, wherein the single ratchet has a plurality of teeth;
at least one drive plate rotatably mounted to the drive tube;
a pawl rotatably mounted to the at least one drive plate and positioned to engage the teeth on the single ratchet; and
first and second air drivers mounted to opposite sides of the main housing, each having a reciprocating stroke shaft pivotably connected to the at least one drive plate in a position to cause the at least one drive plate to rotate as the stroke shafts reciprocate;
wherein when the pawl is engaged with one of the teeth, activation of one of the first and second air drivers will cause the at least one drive plate and the single ratchet in a power stroke to urge the drive tube to rotate in a first direction, and activation of the other of the first and second air drivers will cause the at least one drive plate to rotate in an opposite direction on the drive tube in a return stroke to move the pawl to engage another of the teeth on the single ratchet.

2. The air driven actuator of claim 1 wherein the first and second air drivers are brake actuators.

3. The air driven actuator of claim 1 further comprising a directional control that controls which direction the single ratchet and the drive tube rotate.

4. The air driven actuator of claim 3 wherein the directional control comprises a control lever arm connected to the pawl by first and second directional control springs.

5. The air driven actuator of claim 1 further comprising a pilot valve positioned to be actuated by the position of one of the at least one drive plate and the reciprocating stroke shafts.

6. The air driven actuator of claim 1 further comprising an air inlet on each of the first and second air drivers, and a main air control valve on the main housing plumbed to direct pressurized air toward the air inlets.

7. The air driven actuator of claim 6 further comprising a pilot valve configured to control the main air control valve.

8. The air driven actuator of claim 1 wherein the first and second air drivers are rolling lobe air springs.

9. The air driven actuator of claim 1 further comprising a shaft mounted to the drive tube.

10. In a semitrailer landing gear of the type having a pair of spaced arms, a mounting bracket for each arm, a leg for each arm geared to extend and retract relative to its respective arm, and a gear box positioned to control extension and retraction of the legs by a cross drive shaft extending between the arms, the improvement comprising:
an air driven actuator mounted to the gearbox and having a main housing;
a drive tube rotatably mounted to the housing and having a single ratchet fixed thereto, wherein the single ratchet has a plurality of teeth wherein the cross drive shaft is connected to the drive tube;
at least one drive plate rotatably mounted to the drive tube;
a pawl rotatably mounted to the at least one drive plate and positioned to engage the teeth on the single ratchet; and
first and second air drivers mounted to opposite sides of the main housing, each having a reciprocating stroke shaft pivotably connected to the at least one drive plate in a position to cause the at least one drive plate to rotate as the stroke shafts reciprocate;
wherein when the pawl is engaged with one of the teeth, activation of one of the first and second air drivers will cause the at least one drive plate and the single ratchet in a power stroke to urge the drive tube and the cross drive shaft to rotate in a first direction, and activation of the other of the first and second air drivers will cause the at least one drive plate to rotate in an opposite direction on the drive tube in a return stroke to move the pawl to engage another of the teeth on the single ratchet.

11. The improved landing gear of claim 10 wherein the first and second air drivers are one of brake actuators or rolling lobe springs.

12. The improved landing gear of claim 10 further comprising a directional control that controls which direction the single ratchet and the drive tube rotate.

13. The improved landing gear of claim 12 wherein the directional control comprises a control lever arm connected to the pawl by first and second directional control springs.

14. The improved landing gear of claim 10 further comprising a pilot valve positioned to be actuated by the position of one of the at least one drive plate and the reciprocating stroke shafts.

15. The improved landing gear of claim 10 further comprising an air inlet on each of the first and second air drivers, and a main air control valve on the main housing plumbed to direct pressurized air toward the air inlets.

16. The improved landing gear of claim 15 further comprising a pilot valve configured to control the main air control valve.

* * * * *

UNITED STATES PATENT AND TRADEMARK OFFICE
CERTIFICATE OF CORRECTION

PATENT NO. : 8,894,039 B2
APPLICATION NO. : 14/119260
DATED : November 25, 2014
INVENTOR(S) : Richard L. Conaway It is certified that error appears in the above-identified patent and that said Letters Patent is hereby corrected as shown below:

In the Specification

Column 7, line 12 reads: "...shaft to drive the gearbox 20 or the cross shaft 22 as in RIG."

It should read: "...shaft to drive the gearbox 20 or the cross shaft 22 as in FIG."

Signed and Sealed this
Twenty-fourth Day of February, 2015

Michelle K. Lee
*Deputy Director of the United States Patent and Trademark Office*